United States Patent [19]
Shaffer et al.

[11] Patent Number: 5,995,596
[45] Date of Patent: Nov. 30, 1999

[54] SYSTEM AND METHOD FOR COORDINATION OF MULTIMEDIA MESSAGES ACROSS MULTIPLE SYSTEMS

[75] Inventors: Shmuel Shaffer, Palo Alto; William J. Beyda, Cupertino, both of Calif.

[73] Assignee: Siemens Information and Communication Networks, Inc., Boca Raton, Fla.

[21] Appl. No.: 08/815,256

[22] Filed: Mar. 12, 1997

[51] Int. Cl.$^6$ ..................................................... H04M 1/64
[52] U.S. Cl. ..................................... 379/88.18; 379/88.22
[58] Field of Search ............................. 379/100.08, 202, 379/67.1, 88.01, 88.27, 88.22, 88.12, 88.13, 88.14, 88.18, 88.25; 358/401, 402, 403

[56] References Cited

U.S. PATENT DOCUMENTS

| | | |
|---|---|---|
| 4,612,416 | 9/1986 | Emerson et al. . |
| 4,837,798 | 6/1989 | Cohen et al. ........................ 379/88.14 |
| 4,935,954 | 6/1990 | Thompson et al. . |
| 5,220,596 | 6/1993 | Patel ..................................... 379/93.24 |
| 5,301,226 | 4/1994 | Olson et al. . |
| 5,333,266 | 7/1994 | Boaz et al. ......................... 395/200.36 |
| 5,440,623 | 8/1995 | Moore et al. ........................ 379/88.26 |
| 5,454,030 | 9/1995 | De Oliveira et al. ............. 358/402 X |
| 5,572,578 | 11/1996 | Lin et al. ................................ 379/235 |
| 5,646,982 | 7/1997 | Hogan et al. ........................ 379/88.22 |
| 5,903,627 | 5/1999 | Shaffer et al. .......................... 379/67.1 |

FOREIGN PATENT DOCUMENTS

| | | |
|---|---|---|
| 0 565 850 | 10/1993 | European Pat. Off. . |
| WO 96/11542 | 4/1996 | WIPO . |

OTHER PUBLICATIONS

Miller, J.G. et al., "Accessing Messages Your Way", *AT&T Technology*, vol. 10, No. 1, Mar. 21, 1995, pp. 6–9.

*Primary Examiner*—Scott Weaver

[57] ABSTRACT

A system and method for coordinating multi-media messages across multiple systems. A networked messaging system 10 having a plurality of mailboxes 50 according to the present invention comprises a first mailbox configured to receive a first plurality of messages and a second mailbox operably coupled to the first mailbox and configured to receive a second plurality of messages. A control system 37 is coupled to control the first mailbox and the second mailbox. The control system 37 is configured to generate first tokens corresponding to the first plurality of messages. The control system 37 is further configured to transfer the tokens from the first mailbox to the second mailbox and is configured to use the first tokens to access the first plurality of messages from the first mailbox responsive to the second mailbox itself being accessed.

19 Claims, 8 Drawing Sheets

FIG_1

FIG_2

FIG_3

FIG. 4

FIG_7

SYSTEM AND METHOD FOR COORDINATION OF MULTIMEDIA MESSAGES ACROSS MULTIPLE SYSTEMS

BACKGROUND OF THE INVENTION

1. Field of the Invention

The present invention relates to messaging systems and, more particularly, to a system and method for coordinating messages across multiple systems.

2. Description of the Related Art

Many people today employ a variety of messaging systems of multiple types. For example, a user may have a plurality of e-mail accounts, and a plurality of voice mail accounts.

In the case of voice messaging systems, the user may have a work voice telephone number, a cellular telephone voice number and a home telephone voice number. The user may further have more than one work voice telephone number at more than one local and/or remote sites. Typically, each voice number is associated with a voice mailbox. A sender may leave a message at any of the user's mailboxes. The proliferation of various mailboxes at various sites permits the user to be reached at a variety of locations using local telephone calls. However, in order for the user to retrieve his messages, the user must access each of his mailboxes associated with each site. This can be both time-consuming and expensive, particularly since the user typically has no way of knowing whether a message is, in fact, waiting at any of the remote mailboxes.

Similarly, a user may have a plurality of different e-mail accounts. For example, the user may have e-mail at work at one site and e-mail at home. The user may also have an e-mail account at a remote site, for example, one associated with a remote office. Again, the user must access each account individually in order to retrieve all his messages and typically has no way of knowing when a message is pending at a remote location.

Accordingly, it is desirable to provide a system and method whereby a user may access several of a plurality of messaging systems without having to manually access each and every one of his mailbox systems.

SUMMARY OF THE INVENTION

These drawbacks in the prior art are overcome in large part by a system and method for coordinating multi-media messages across multiple systems according to the present invention. The networked messaging system having a plurality of mailboxes according to the present invention comprises a first mailbox configured to receive a first plurality of messages and a second mailbox operably coupled to the first mailbox and configured to receive a second plurality of messages. A control system is coupled to control the first mailbox and the second mailbox. The control system is configured to generate first tokens corresponding to at least one of the first plurality of messages responsive to a message being received at the first mailbox. The control system is further configured to transfer the tokens from the first mailbox to the second mailbox and is configured to use the first tokens to access the first plurality of messages from the first mailbox responsive to the second mailbox itself being accessed.

In a preferred embodiment, the control system comprises a control unit at the first mailbox and a control unit at the second mailbox. The control system is further configured to generate second tokens corresponding to at least one of the second plurality of messages and is configured to transfer the second tokens to the first mailbox. The control system is further configured to use these second tokens to access the second plurality of messages responsive to the first mailbox being accessed.

In one embodiment, one mailbox is user configurable as a central mailbox. The central mailbox receives tokens from remote mailboxes when messages are received at the remote mailboxes. When a predetermined number of tokens indicative of remote messages have been received, the central mailbox accesses the remote mailboxes and downloads the messages corresponding to the tokens. Alternatively, the remote mailboxes may be configured to be accessed when the user is accessing the central mailbox.

A method for coordinating message delivery across messaging systems at remote sites according to the present invention comprises receiving a first message at a first mailbox and generating a first token corresponding to the first message. The method further comprises linking the first mailbox with the second mailbox and providing the first token to the second mailbox. Finally, the method comprises playing the first message at the second site responsive to the second mailbox receiving the first token. Playing the first message may comprise, for example, serially logging on to the first mailbox upon accessing the second mailbox.

BRIEF DESCRIPTION OF THE DRAWINGS

A better understanding of the present invention is obtained when the following detailed description is considered in conjunction with the following drawings in which.

DETAILED DESCRIPTION OF THE INVENTION

Figure 1:
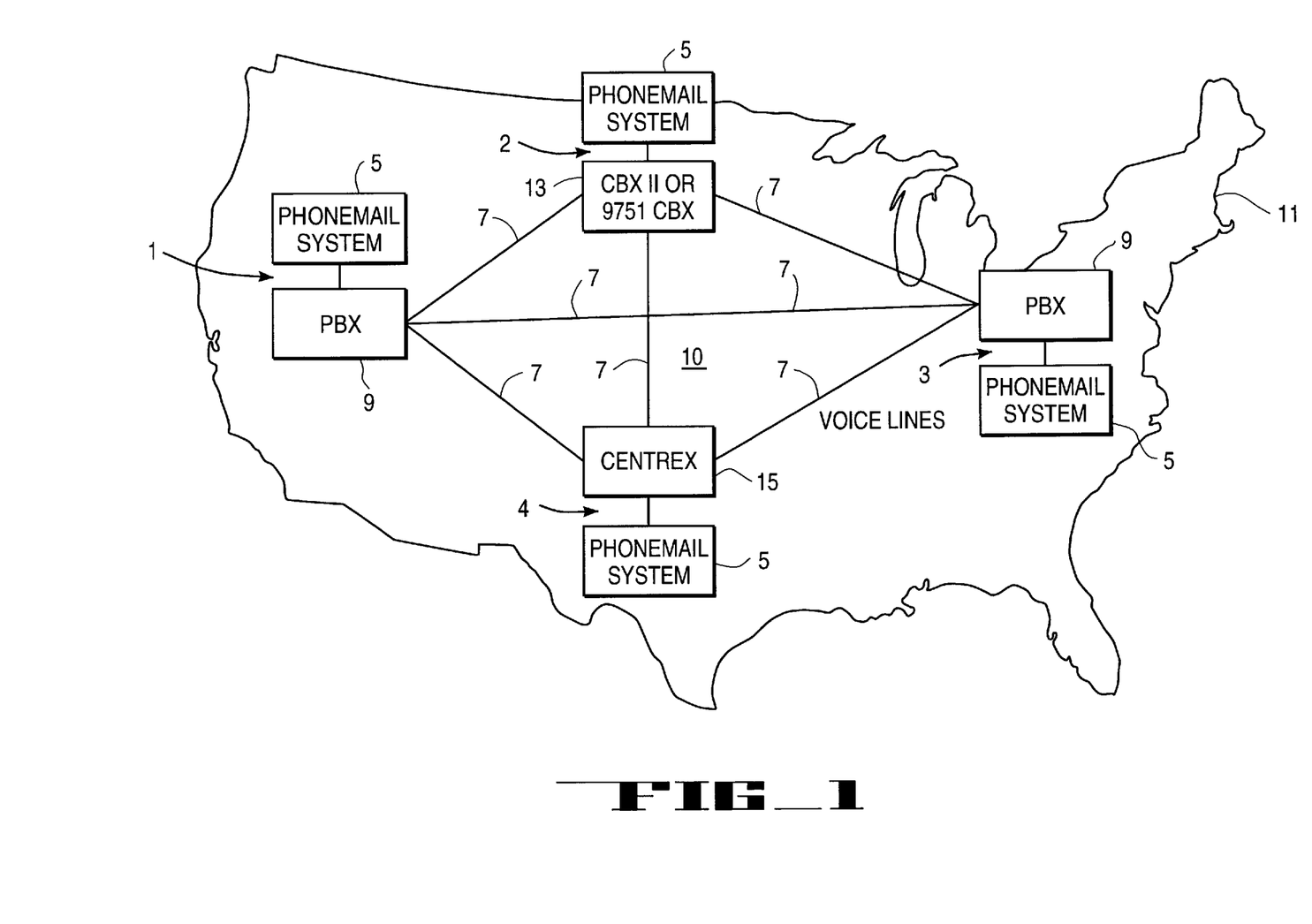
FIG. 1 is a block diagram of a networked messaging system according to one embodiment of the present invention.

FIG. 1—Networked Messaging System

Turning now to FIG. 1, a diagram illustrating a typical messaging network 10 is shown. A messaging network 10 includes sites 1 through 4, each of which includes a messaging system 5. A distributed control system (not shown), preferably comprising a control unit for each mail system 5, controls operation of the mailboxes and the network. Note that for purposes of illustration the sites 1 through 4 are shown within the continental United States 11, but such a messaging network can be worldwide. Note also that, while described in the context of a voice mail system, the present invention is not so limited. A variety of messaging systems, such as e-mail, facsimile, video, any type of multimedia messaging systems, or any combinations thereof, may be employed. Thus, FIG. 1 is exemplary only.

For purposes of illustration, each of the sites 1 through 4 are differently configured, and are connected to one another via voice or telephone lines 7. Site 1 includes a Non-Siemens (registered trademark of Siemens Corp.) PBX (private branch exchange) 9. Site 2 includes CBX (computerized branch exchange) II (trademark of Siemens Business Communication Systems, Inc., Santa Clara, Calif.) or a 9751 CBX 13. Site 3 includes another Non-Siemens PBX, and site 4 includes a Centrex system 15.

According to the present invention, a user is assigned one or more mailboxes in one or more of the mail or messaging systems 5 at sites 1 through 4. The user (or the system administrator) configures his mailboxes such that messages received at each of the mailboxes may be retrieved upon the user accessing a particular one of the mailboxes. Thus, each mailbox is "marked" as "one of many."

In response, each messaging system 5 generates a token for each message received at the user's mailbox(es), and then transfers the token to each of the other mailboxes. Token generation and transfer may occur immediately after reception of the message, or any predetermining time thereafter. The actual messages need not be transferred until it is known where the user is retrieving his messages (i.e., a predetermined time after the message has been received). The token comprises, for example, information identifying the mailbox, the sender, and the time and date of the message. When the user accesses a particular mailbox, the mailbox controller reads the presence of the tokens and accesses the remote mailboxes for the messages. This may comprise, for example, an automatic accessing of the remote mailboxes and downloading the messages corresponding to the received tokens. Any long distance networking protocol, for example. based on AMIS, may be employed. The messages are preferably played back in a predetermined order, such as forward or reverse chronological order. In one embodiment, all of the messages are downloaded as soon as the user accesses a particular mailbox. In another embodiment, a look-ahead technique is employed, such that messages at remote sites are downloaded only when the user is within one or two messages of the message identified by the token.

In one embodiment, rather than representing individual messages, the tokens represent only that a particular remote mailbox has received a message. Upon the user accessing his local mailbox, the remote mailboxes which have corresponding tokens are serially accessed (i.e., after the user has listened to the messages stored in the local mailbox, the user is automatically transferred to the next mailbox which a token identifies as having a stored message).

In a yet further embodiment, the user configures one of the mailboxes as a central mailbox (i.e., the mailbox presently local to the user), such that it is the only mailbox to receive the tokens and messages. The user may, at any time, designate another of the mailboxes as central. In this embodiment, the messages are downloaded to the central mailbox after a predetermined number of messages have been received at remote sites. Alternatively, the messages may be sent to the central mailbox as soon as they are received at the local mailboxes. The central mailbox is configured to be selectable based on a manual user-designation, or automatically based on input of the user's schedule.

In another embodiment, the voice mail system is configured to allow a user to designate a mailbox—not previously associated with the user—as temporarily associated with the user. For example, the temporary user may be a guest of the person who is permanently associated with the mailbox. The temporary user can log in using a touch tone menu system and identify the temporary mailbox as associated with him. Then, tokens are sent to the temporary mailbox when messages are delivered to the user's permanent mailboxes. When the temporary or permanent user accesses the temporarily associated mailbox, the system is configured to inform the user of the presence of messages at the remote sites associated with the other user and allow a download option.

Figure 2:
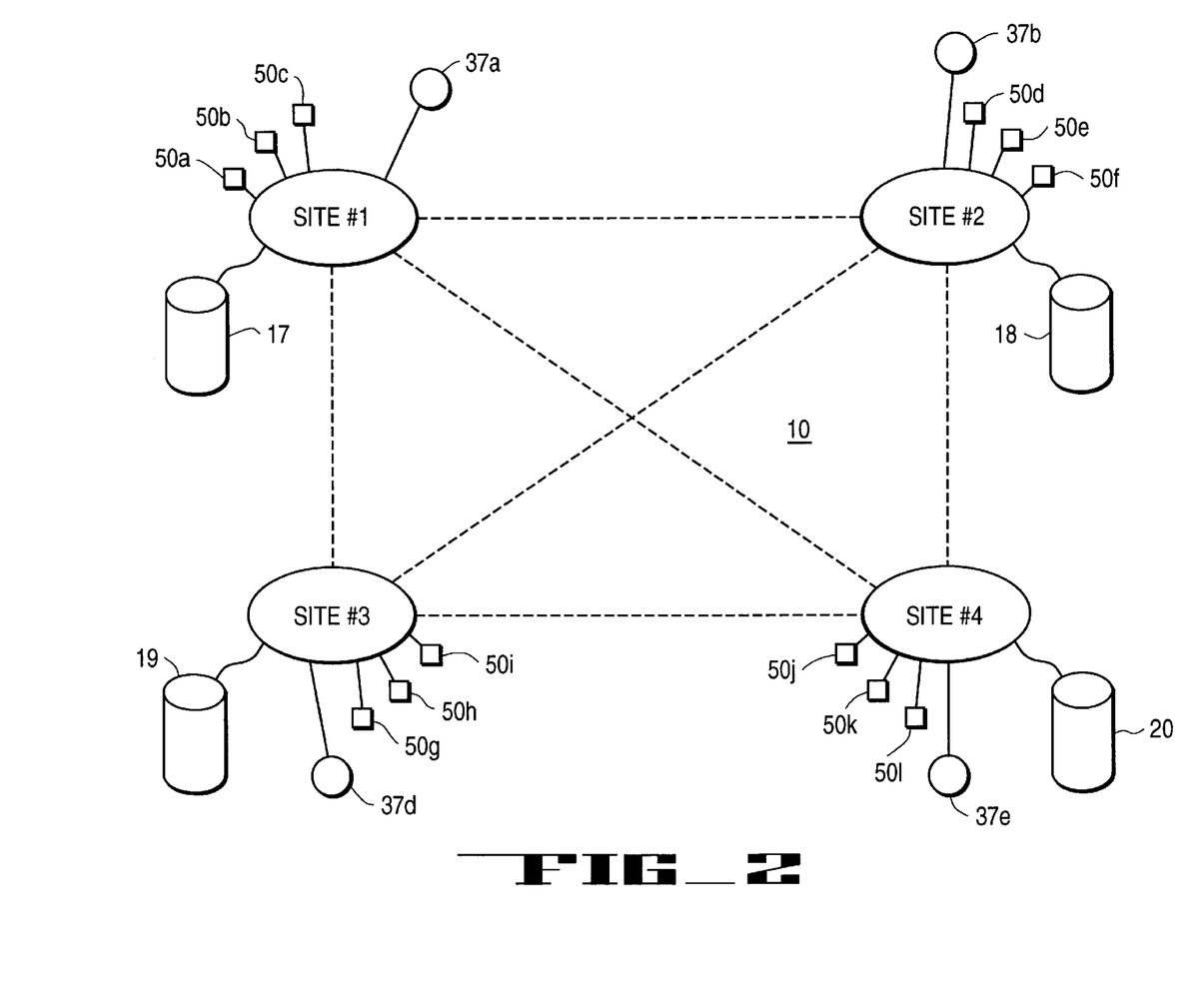
FIG. 2 is a more detailed diagram of a messaging system having messaging control units according to one embodiment of the present invention.

FIG. 2—Mail Network Control Units

Turning now to FIG. 2, a more detailed diagram illustrating the mail systems 5 at sites 1 through 4 is shown. The mail, or messaging systems 5, at sites 1 through 4 include mailboxes 50a through 50c, 50d through 50f, 50g through 50i, and 50j through 50l, respectively. Each mailbox is assigned to a user. More than one mailbox may be assigned to the same user. The mail systems 5 at sites 1 through 4 include databases 17 through 20, respectively, and control units 37a through 37d, respectively. In the example shown, at any of the sites 1 through 4, the control units 37a through 37d supervise message handling, user profiles, and token handling. The databases 17 through 20 store the local users' profiles, and network profiles for local users' remote mailbox sites.

More particularly, the users (or their system administrators) store information associating the user with his local and remote mailboxes at the local and remote mail systems 5 at site 1 through 4. When a message is received at a particular mailbox, the respective control unit accesses the local database for remote profiles, and generates and transfers a token corresponding to the message to the remote mailboxes. It is noted that, in one embodiment, a token corresponds to each message; in another embodiment, a token corresponds only to each remote mailbox. When the user accesses a particular mailbox, the token indicates that a message is waiting at another mailbox. The remote messages are then transferred to the local site.

Figure 3:
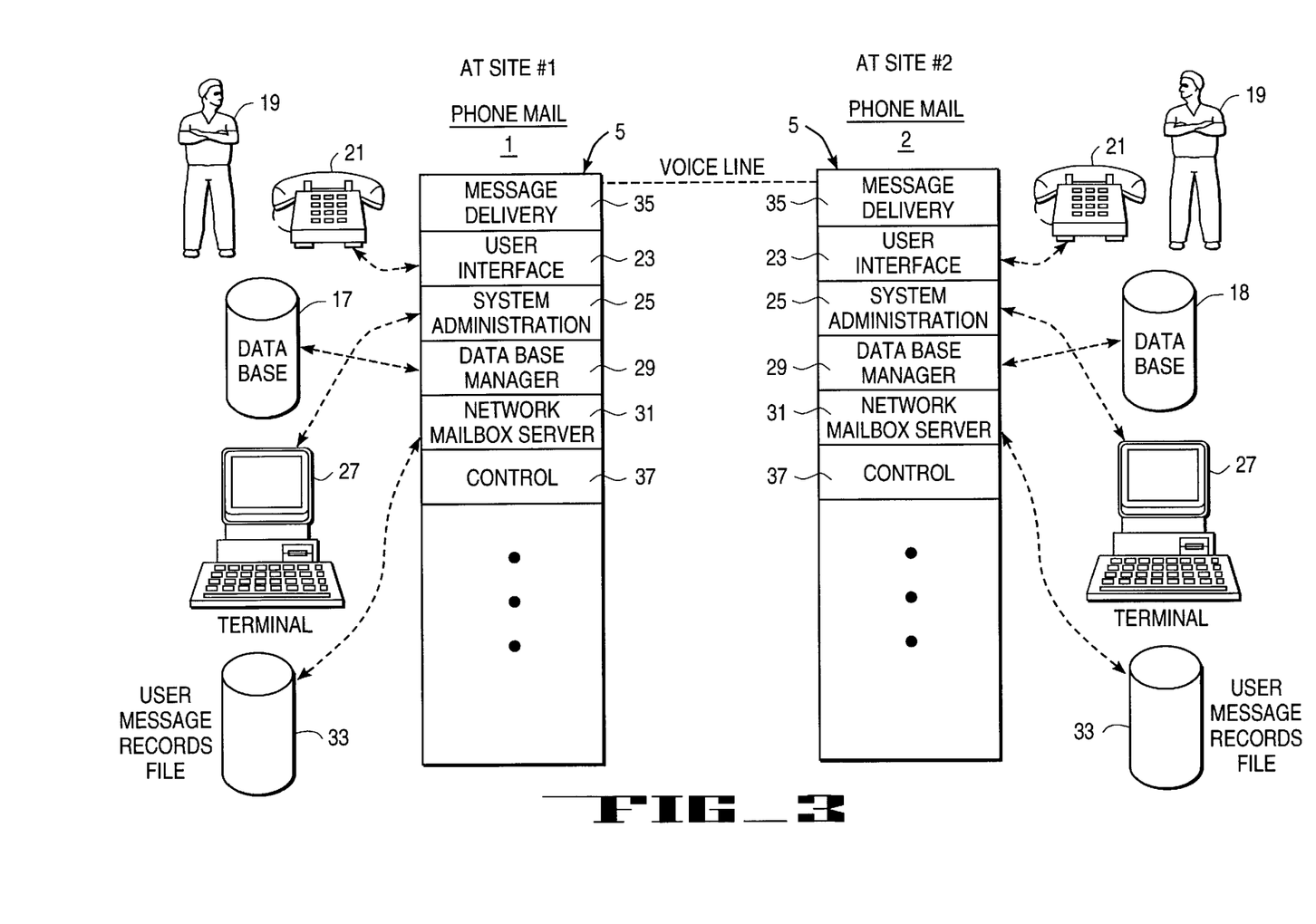
FIG. 3 is a diagram of the communication of tokens and messages between various sites having different messaging systems.

FIG. 3—Block Diagram of Token Communication

Turning now to FIG. 3, a more detailed block diagram of the communication of tokens and messages between sites 1 and 2, for example, is shown for the associated mail systems 5.

In this example, each user 19 uses a telephone 21 to interact with an associated mailbox system. As illustrated, the mailbox or messaging system comprises a user interface module 23, a system administrator module 25, a database manager 29, a network mailbox server 31, and a control module 37. Control module or unit 37 is configured to supervise operations of the messaging system. User interface module 23 is used to record or play back voice messages. System Administration module 25 interacts with the System Administrator (SA) at the associated site 1 or 2, in this example, through a terminal 27, for permitting the SA to perform system configuration and system monitoring. A database manager module 29 interacts with other associated mail modules 5 to support database-related functions. A network mailbox server (NMS) 31 interacts with the associated user interface module 23 and database manager module 29 to support functions related to voice messages by managing an associated user message records (UMR) file 33. These comprise, for example, keeping track of tokens and remote messages.

It is noted that a mail system 5 may comprise additional modules, but for purposes of illustrating the present invention, it is not necessary to show them here. A user 19 interacts with the user interface module 23, and the latter with other modules such as the database manager 29, to both record a message and address it. Upon receiving a message, the control unit 37 accesses database 17 to determine if the recipient has any associated mailboxes, for example, mailboxes at remote sites. Upon detecting a message for a user having a remote mailbox, a token is generated, which the control unit 37 communicates to the message delivery module 35 at the remote site 2. As noted above, the token comprises mailbox, sender, and date information.

The control unit 37 at site 2 causes the remote message delivery system 35 to receive the token, and determines to which mailbox it is to be directed. The network mailbox server 31 stores the token in the corresponding user message records file 33. When the user accesses a particular mailbox, typically via user interface 21, the network mailbox server 31 retrieves the message from the user message records file 33. In so doing, the network mailbox server reads the presence of the tokens. The database manager 29 then accesses the database 18 to determine the corresponding remote mailboxes. The message delivery system then receives the messages corresponding to the tokens. The messages are then delivered to the user via user interface module 23 and telephone 21. Finally, the messages themselves may be stored by the network mailbox server 31 in the user message records file 33.

Retrieving the messages from the remote mailboxes may comprise, for example, automatically accessing the remote mailboxes and downloading the messages corresponding to the received tokens. As noted above, any long distance networking protocol, for example, based on AMIS, may be employed. The destination mail system 5 preferably plays back the messages in a predetermined order, such as forward or reverse chronological order In one embodiment, all of the messages are downloaded as soon as the user accesses a particular mailbox. In another embodiment, a look-ahead technique is employed, such that messages at remote sites are downloaded only when the user is within one or two messages of the message identified by the token.

In one embodiment, rather than representing individual messages, the tokens represent only that a particular remote mailbox has received a message. Upon the user accessing his local mailbox 5, the remote mailboxes which have corresponding tokens are serially accessed (i.e., after the user has listened to the messages stored in the local mailbox, the user is automatically transferred to the next mailbox which a token identifies as having a stored message).

In a yet further embodiment, the user configures one of the mailboxes as a central mailbox (i.e., the mailbox presently local to the user), such that it is the only mailbox to receive the tokens and messages. The user may, at any time, designate another of the mailboxes as central. In this embodiment, the messages may be downloaded to the central mailbox after a predetermined number of messages have been received at remote sites. Alternatively, the messages may be sent to the central mailbox as soon as they are received at the local mailboxes. The central mailbox is configured to be selectable based on a manual user-designation, or automatically based on input of the user's schedule.

In one embodiment, in addition to being able to identify one of the user's associated mailboxes as a central mailbox, the mail system according to one embodiment is configured to allow a user to designate a mailbox—not previously associated with the user—as temporarily associated with the user. For example, the temporary user may be a guest or invitee of the person who is permanently associated with the mailbox. The temporary user can log in using a touch tone menu system and identify the temporary mailbox as associated with him. Then, tokens are sent to the temporary mailbox when messages are delivered to the user's permanent mailboxes. When the temporary or permanent user accesses the temporarily associated mailbox, the control unit 37 is configured to inform the user of the presence of messages at the remote sites associated with the other user and allow a download option.

Figure 4:
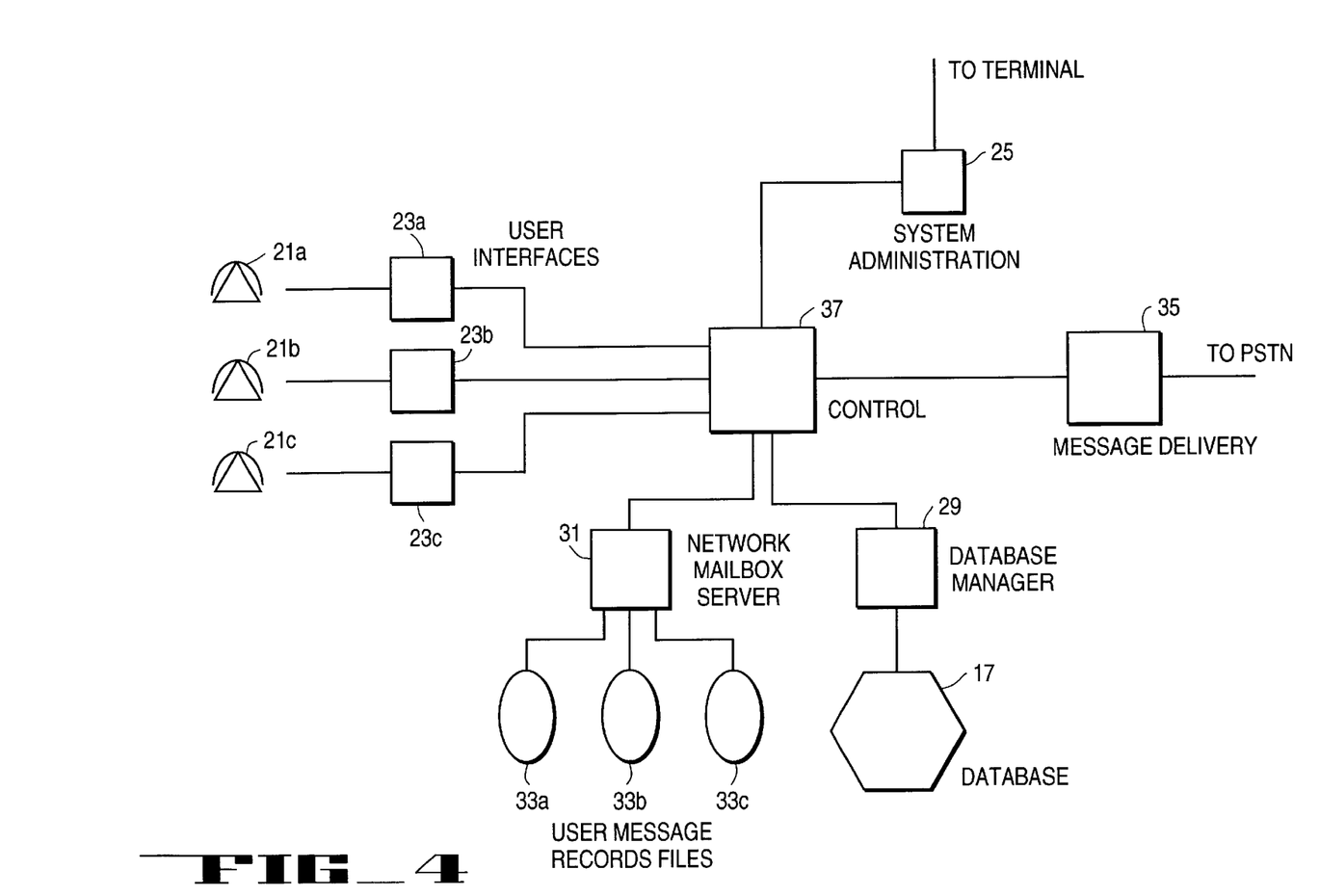
FIG. 4 is a block diagram of a messaging system according to one embodiment of the present invention.

FIG. 4—Block Diagram of Voice Mail System

Turning now to FIG. 4, a block diagram illustrating a voice mail system at one site is shown. The voice mail system includes a control unit 37 configured to supervise handling of messages and tokens, as will be described in greater detail below. Control unit 37 is exemplary of any of a variety of microprocessors or microcontrollers, any combinations thereof, and any other control circuitry. Control unit 37 is coupled to system administration module 25. System administration module 35 permits a system administrator at a terminal (not shown) to input user profiles, including configuration information relating to each user's local and remote mailboxes.

The control unit 37 is further coupled to a plurality of user interfaces 23a through 23c, each coupled to a telephone 21a through 21c, respectively. Telephones 21a through 21c and user interfaces 23a through 23c permit users to access their mailboxes, as will be explained in greater detail below. Users are also able to leave messages for other local users. It is noted that while three user interfaces 23a through 23c and telephones 21a through 21c are illustrated, any number may be supported. Thus, FIG. 4 is exemplary only, The control unit 37 is further coupled via a database manager 29 to a database 17. Database 17 is used to store the user profiles that have been input by the system administrator via the system administration module 25. The control unit 37 is coupled to a network mailbox server 31 which stores incoming messages and tokens in the appropriate user message records files 33a through 33c. In a preferred embodiment, at least one user message records file is associated with each user. It is noted that while illustrated as discrete units, database 17 and user message records files 37a through 37c are preferably comprised in one or more volatile or nonvolatile memory devices.

Messages are typically received from the public switched telephone network (PSTN) at message delivery module 35, though messages may also be received from users within the system. Control unit 37 reads any control and/or header information associated with the appropriate networking protocol and directs the incoming messages to the network mailbox server 31. The network mailbox server 31 stores the message in the appropriate user message records file 33a through 33c. In addition, after determining the destination of the message, control unit 37 accesses database 17 through database manager 29 to determine whether the user for whom the message is to be routed has any other mailboxes, either local or remote. If so, control unit 37 sends a token identifying the message to the other mailboxes associated with the user. Similarly, the control unit 37 receives tokens from remote sites and stores them in the corresponding local mailboxes.

When the user accesses his mailbox, the control unit 37 reads the presence of tokens in the user message records file and accesses the corresponding remote mailboxes. The remote messages may be downloaded automatically at the beginning of the access. Alternatively, the control unit 37 may detect the presence of tokens and provide an announcement to the user at the beginning of access, and give him the option of accessing the remote messages.

In one embodiment, rather than corresponding to individual messages, the tokens identify only the identity of the mailbox in which the actual message is stored. In that case, the control unit 37 keeps track of the mailboxes which contain remote messages, and sequentially logs into the remote mailboxes when the user accesses the local mailbox. Alternatively, the token may identify only the fact that there is a message in one of the remote mailboxes. In this case, the control unit 37 sequentially logs on to all the mailboxes associated with the user. The control unit 37 stops, for example, when it returns to its position in the queue.

In another embodiment, one of the user's mailboxes is identified by the user as a central mailbox. In this case, the tokens are sent only to the central mailbox. In addition, or alternatively, the messages themselves may be sent. This obviates the need to send tokens to a plurality of locations. The central mailbox is preferably configurable by the user via a touch-tone telephone menu system and through the corresponding user interface. This obviates the need for the system administrator to continually update user profiles. However, provision is also made for the system administrator to identify a particular mailbox as the central mailbox. In either case, if the central mailbox is local, the control unit 37 "marks" the mailbox and transmits a control command to the other mail systems, such that they too can track the central mailbox.

In addition to being able to identify one of the user's associated mailboxes as a central mailbox, the voice mail system illustrated in configured to allow a user to designate a mail-box—not previously associated with the user—as a temporarily associated with the user. For example, the temporary user may be a guest or invitee of the person who is permanently associated with the mailbox. The temporary user can log in using a touch tone menu system and identify the temporary mailbox as associated with him. Then, tokens are sent to the temporary mailbox when messages are delivered to the user's permanent mailboxes. When the temporary or permanent user accesses the temporarily associated mailbox, the control unit 37 is configured to inform the user of the presence of messages at the remote sites associated with the other user and allow a download option.

It is noted that while illustrated in terms of discrete blocks, various of the components of the voice mail system may be combined with others and are implementable in hardware and/or software. Thus, FIG. 4 is exemplary only.

Figure 5:
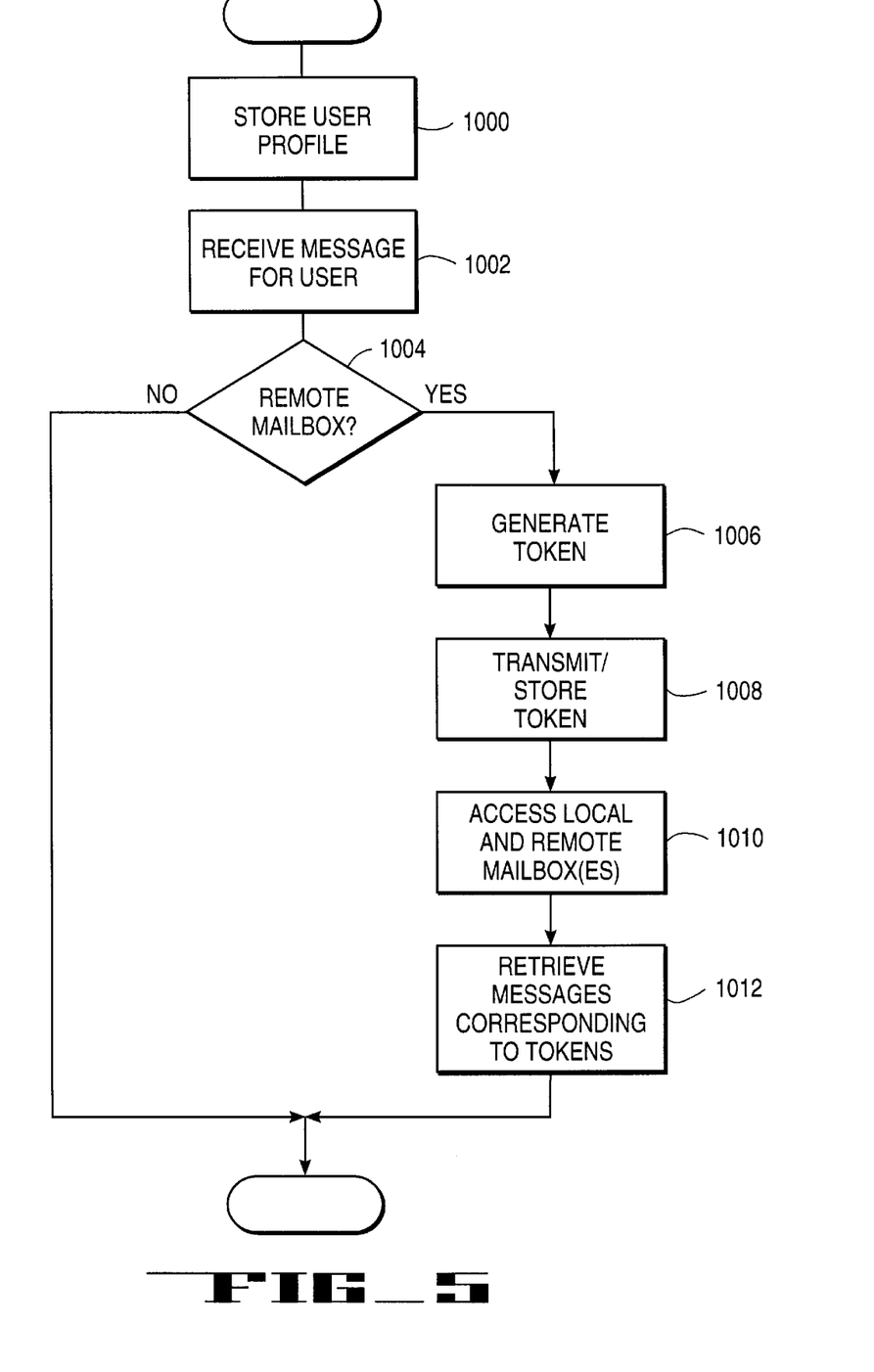
FIG. 5 is a flowchart of one embodiment of a delivery method for messages according to the present invention.

FIG. 5—Flowchart of One Embodiment of Delivery Method

Turning now to FIG. 5, a flowchart illustrating a method for coordinating delivery of messages across a plurality of messaging systems according to the present invention is shown. Initially, the user profile is stored (Step 1000). The user profile comprises, for example, information associating a particular user with a particular mailbox at a local site. It is noted that one or more local mailboxes may be associated with a particular user. In addition, the user profile comprises an association of the user and mailboxes, if any, at remote sites. This information is preferably stored in the database 17 by the database manager 29. The user profiles are preferably initially set by a system administrator via the system administration module 25, but can be updated by the user.

Once all user profiles have been stored, the system is ready to receive messages (Step 1002). Receiving the messages includes, for example, reading any control information transmitted along with the actual user information, such as the destination and source sites, mailboxes, and the like. Upon an incoming message being received at the message delivery module 35 of the local mailbox, the mailbox control unit 37's database manager 29 accesses the database 17 to determine whether or not any remote mailboxes are associated with the user (Step 1004).

If remote mailboxes are associated with the user, the controller for the local mailbox generates a token corresponding to the message received (Step 1006). More particularly, the controller 32 generates a token corresponding to the message for each of the mailboxes at both local and remote sites for which the user is associated. The tokens are then transmitted to the corresponding mailboxes at remote sites via message delivery module 35; tokens for secondary local mailboxes are merely stored in the corresponding user message records file (Step 1008).

If the user then travels to the remote site, he may access the remote (now local) mailbox (it is noted, of course, that the user could access the local mailbox for remote messages directly, using similar process steps, without having to travel to the remote site) (Step 1010). For example, the user may travel to remote site #2 (FIG. 3) and access his mailbox in phone mail system 5 using telephone 21 to access user interface module 23. While the user is accessing the remote mailbox, network mailbox server 31 determines whether any tokens received from other mailboxes are present in the mailbox currently being accessed. As noted above, the tokens may be from mailboxes at remote sites, or from other mailboxes at the current site. If tokens are present, messages corresponding to the received tokens are received from the then remote mailboxes at the message delivery module of the current mailbox (Step 1012).

Retrieving the remote messages corresponding to the tokens takes one of several forms. According to one embodiment, the remote messages are accessed by serially logging onto each of the remote mailboxes which a token identifies as having a message stored therein. According to another embodiment, once the remote mailbox is accessed, the remote mailbox control unit reads the tokens and causes the remote mailboxes corresponding to received tokens, i.e., received messages, to be accessed and the messages are downloaded to the then local mailbox. The messages are retrieved either at the initiation of the mailbox accessing procedure, or through a look-ahead technique one or two messages ahead of the one currently being read. The messages may be arranged and played in forward or reverse chronological order.

Figure 6:
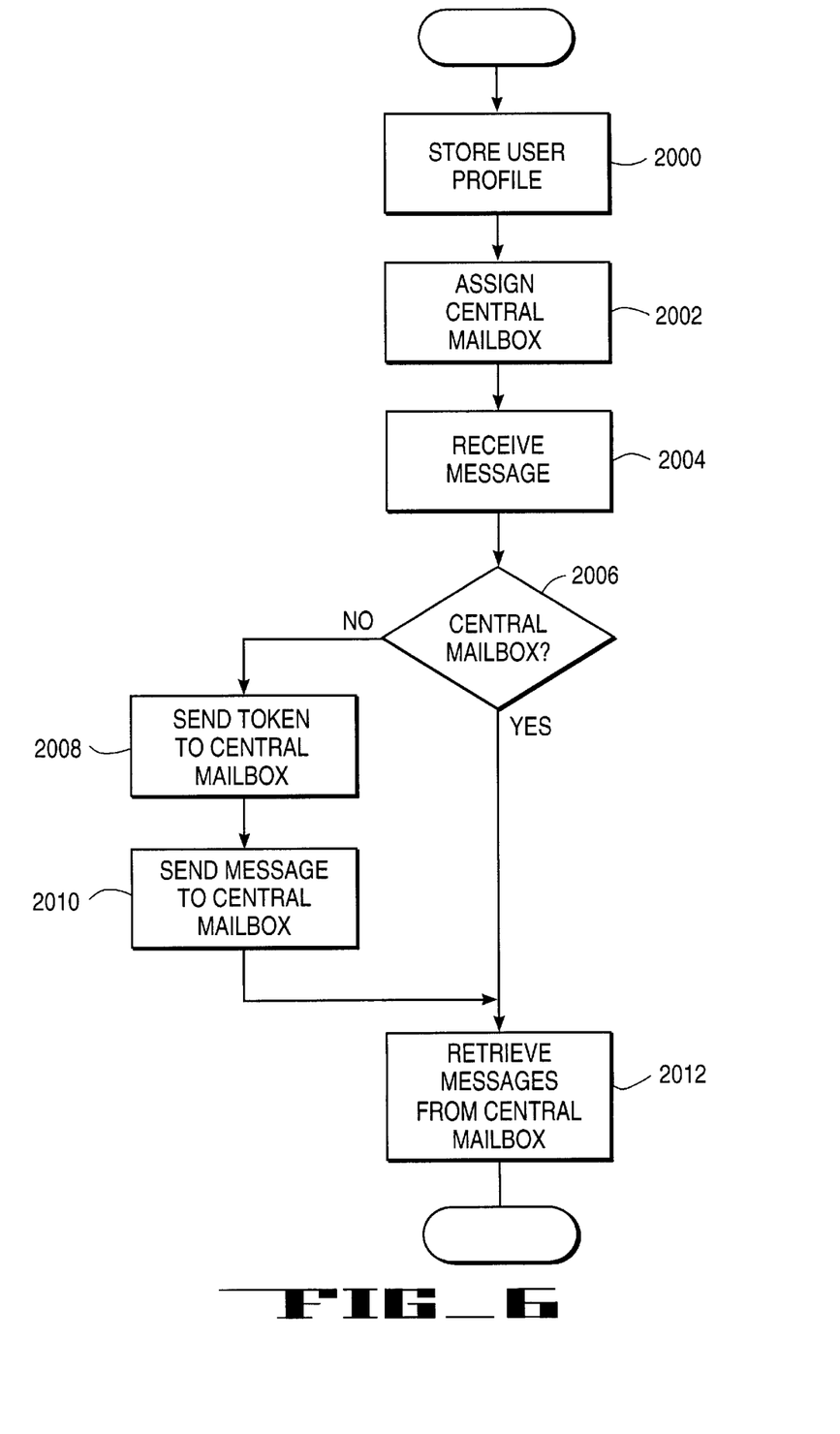
FIG. 6 is a flowchart of an alternate embodiment of a delivery method for messages according to the present invention.

FIG. 6—Flowchart of Alternate Embodiment of Delivery Method

Turning now to FIG. 6, a flowchart illustrating an alternate embodiment of the present invention is shown. More particularly, FIG. 6 illustrates a flowchart of an embodiment in which a user is able to configure a central mailbox for receiving remote messages and/or tokens. Use of a user-designated central mailbox obviates the need for tokens to be transmitted to all of the associated mailboxes.

As in the embodiment illustrated in FIG. 5, a user profile is stored (Step 2000). Again, the user profile includes information concerning whether the user has remote mailboxes in alternate systems or secondary mailboxes within the local system. The user profiles are preferably initially set by a system administrator via the system administration module 25, but can be updated by the user.

The user is next able to assign one of the plurality of mailboxes as a central mailbox (Step 2002). The central mailbox is the mailbox to which all of the tokens and/or messages are to be directed. This obviates the need for the redundant sending of tokens in the system described with regard to FIG. 5. When a message is received at a mailbox (Step 2004), the control system determines whether or not the mailbox is a central mailbox (Step 2006). If the mailbox is a central mailbox, then the message is retrieved by the user as a local message in a straightforward fashion (Step 2012).

If, however, the message has been received into a mailbox that is not a central mailbox, the control unit at the non-central mailbox will generate a token and send it to the central mailbox (Step 2008). Immediately thereafter, the messages themselves are sent. Thus, in one embodiment, the token comprises header information for the message itself. Alternatively, after a predetermined number of tokens have been received into the central mailbox, the central mailbox sends a request to the remote mailboxes to download the remote messages (Step 2010). In another alternate embodiment the central mailbox control unit causes logging on to the other mailboxes rather than an automatic downloading process. Once the messages have been retrieved into the central mailbox the user may retrieve the messages from the central mailbox as described above (Step 2012).

Figure 7:
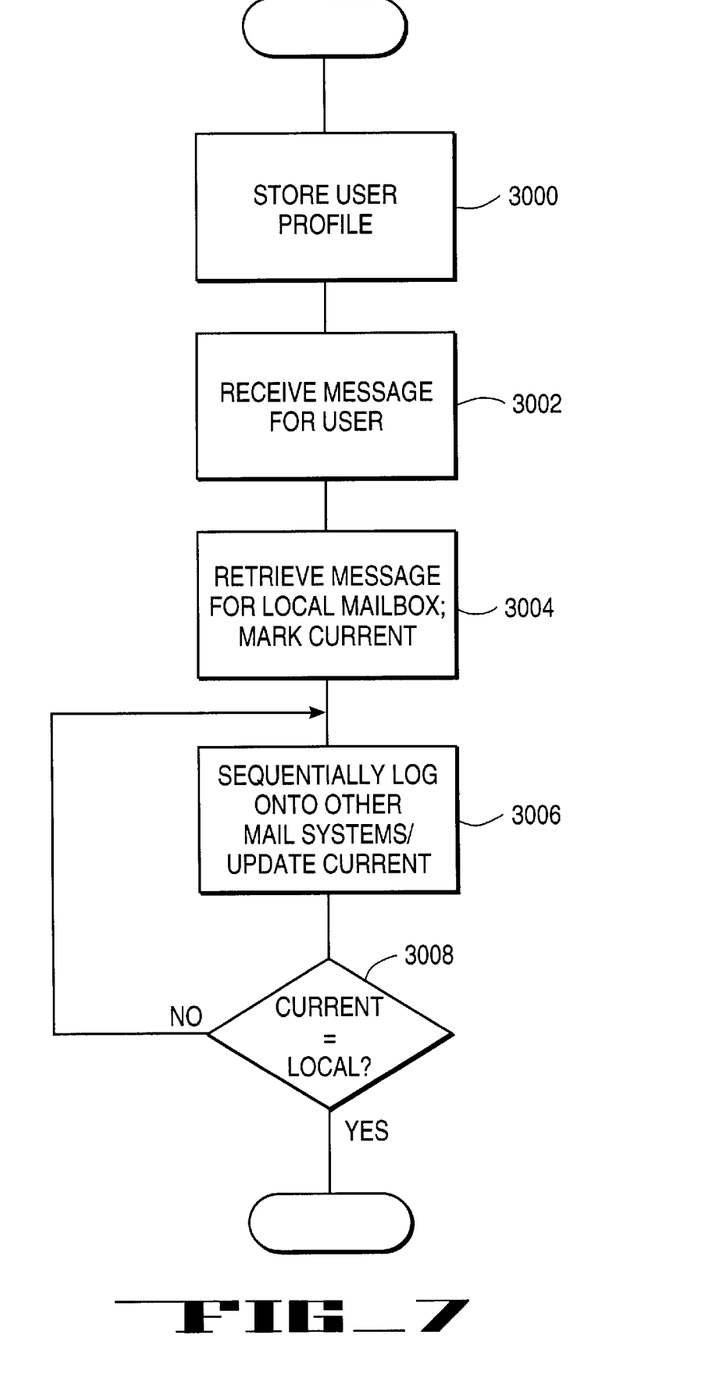
FIG. 7 is a flowchart of an alternate embodiment of a delivery method for messages according to the present invention.

FIG. 7—Flowchart of Serial Message Retrieval Method

Turning now to FIG. 7, a flowchart illustrating message retrieval using serial logging on to remote mailbox systems is illustrated. Initially, as above, a user profile is stored (Step 3000). The user profile comprises, for example, information associating a particular user with a particular mailbox at a local site. It is noted that one or more local mailboxes may be associated with a particular user. In addition, the user profile comprises an association of the user and mailboxes, if any, at remote sites. This information is preferably stored in the database 17 by the database manager 29. The user profiles are preferably initially set by a system administrator via the system administration module 25, but can be updated by the user.

Once all user profiles have been stored, the system is ready to receive messages (Step 3002). Receiving the message includes, for example, reading any control information transmitted along with the actual user information, such as the destination and source sites, mailboxes, and the like. The user is then able to retrieve messages from the local mailbox (Step 3004). If any secondary local or remote mailboxes are associated with the user (as determined, for example, by accessing the database), the control unit 37 "marks" the local mailbox (for example, with a token) and begins to sequentially log into the remote or secondary mailboxes (Step 3006). The system keeps track of which mailbox it is presently logging into, as well as the identity of the local mailbox. If the control system determines that it has cycled back to the original mailbox, the control unit will cease accessing the system (Step 3008). Otherwise, it will continue on with the next mailbox in the system.

It is noted that in one embodiment, all of the mailboxes associated with the user across the various systems are sequentially logged onto. In another embodiment, the local mailbox receives a token identifying which mailbox has received a message and only those mailboxes are logged onto.

Figure 8:
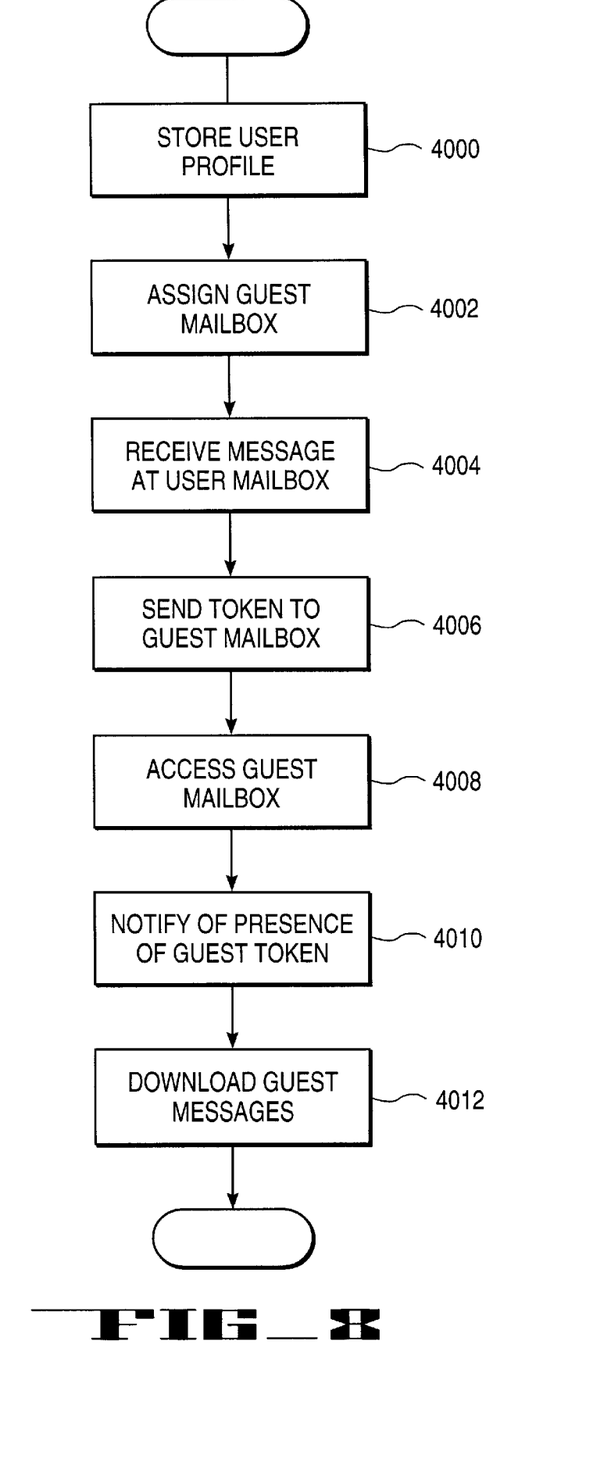
FIG. 8 is a flowchart of an alternate embodiment of a delivery method for messages according to the present invention.

FIG. 8—Flowchart of Guest Message Retrieval Method

Turning now to FIG. 8, a flowchart illustrating guest message retrieval according to an embodiment of the present invention is shown. Initially, as above, a user profile is stored (Step 4000). The user profile comprises, for example, information associating a particular user with a particular mailbox at a local site. It is noted that one or more local mailboxes may be associated with a particular user. In addition, the user profile comprises an association of the user and mailboxes, if any, at remote sites. This information is preferably stored in the database 17 by the database manager 29. The user profiles are preferably initially set by a system administrator via the system administration module 25, but can be updated by the user.

If the user then temporarily relocates to a remote location, he can temporarily initialize a guest mailbox (Step 4002). The guest mailbox comprises, for example, a mailbox in an office that is not the user's permanent office, or even a mailbox at a friend's apartment or house. Initializing the guest mailbox comprises, for example, incorporating the guest mailbox into the user's network of associated mailboxes. More particularly, the user profiles at the user's mailboxes, as well as at the guest mailbox, are updated to reflect the existence of the guest mailbox.

Messages are then received at the user's permanent assigned mailboxes (Step 4004) The control units at the user's mailboxes then access their databases to determine whether a remote mailbox exists, or whether a guest mailbox has been initialized. The control unit then generates a token to identify the received message. The token is then transferred to the guest mailbox (Step 4006).

The guest mailbox can be accessed, either by the guest user or the permanent user (Step 4008). Once the permanent user's identity has been established (typically through use of a personal identification number), the permanent user's messages are played, and the person accessing the mailbox is notified of the presence of the guest tokens (Step 4010). The user is then given the option to access the remote mailboxes. If the user responds affirmatively, the remote messages are downloaded to the guest mailbox (Step 4012).

The invention described in the above detailed description is not intended to be limited to the specific form set forth herein, but on the contrary, it is intended to cover such alternatives, modifications and equivalents as can reasonably be included within the spirit and scope of the appended claims.

We claim:

1. A networked messaging system having a plurality of mailboxes, comprising:

a first mailbox of said plurality of mailboxes, wherein said first mailbox is configured to receive a first plurality of messages;

a second mailbox of said plurality of mailboxes, operably coupled to said first mailbox and located remotely from said first mailbox, wherein said second mailbox is configured to receive a second plurality of messages; and a control system coupled to control said first mailbox and said second mailbox, wherein said control system is configured to generate first tokens corresponding to at least one of said first plurality of messages being received by said first mailbox, wherein said control system is configured to generate said first tokens in response to said at least one of said first plurality of messages being received by said first mailbox;

wherein said control system is configured to transfer said first tokens to said second mailbox, wherein said control system is configured to use said first tokens to access said first plurality of messages from said first mailbox responsive to said second mailbox being accessed.

2. The networked messaging system of claim 1, wherein said control system is configured to generate second tokens corresponding to at least one of said second plurality of messages, and wherein said control system is configured to transfer said second tokens to said first mailbox, wherein said control system is configured to use said second tokens to access said second plurality of messages responsive to said first mailbox being accessed.

3. The networked messaging system of claim 1, wherein said control system comprises a first control unit configured to control said first mailbox and a second control unit configured to control said second mailbox.

4. The networked messaging system of claim 3, wherein said first control unit is configured to generate said first tokens corresponding to said at least one of said first plurality of messages and is configured to transfer said first tokens to said second mailbox, wherein said second control unit is configured to use said first tokens to access said first plurality of messages from said first mailbox responsive to said second mailbox being accessed.

5. The networked messaging system of claim 4, wherein said second control unit is configured to generate said second tokens corresponding to said at least one of said second plurality of messages, and wherein said second control unit is configured to transfer said second tokens to said first mailbox, wherein said first control unit is configured to use said second tokens to access said second plurality of messages responsive to said first mailbox being accessed.

6. The networked messaging system of claim 4, wherein said second control unit is configured to respond to reception of said first tokens by automatically logging on to said first mailbox when said second mailbox is accessed.

7. The networked messaging system of claim 6, wherein said first control unit is configured to respond to reception of said second tokens by automatically logging on to said second mailbox when said first mailbox is accessed.

8. The networked messaging system of claim 1, wherein said control system is user configurable, wherein which of said plurality of mailboxes comprises said first mailbox or said second mailbox is user selectable.

9. The networked messaging system of claim 8, wherein which of said plurality of mailboxes comprises said first mailbox or said second mailbox is user selectable based on a user selectable schedule.

10. The networked messaging system of claim 8, wherein said first mailbox of said plurality of mailboxes is configurable as a central mailbox.

11. The networked messaging system of claim 10, wherein said first mailbox is configurable as said central mailbox according to a user selectable schedule.

12. A method for coordinating message delivery across messaging systems at remote sites, comprising:

receiving a first message at a first mailbox at a first site;

generating a first token corresponding to said first message;

linking said first mailbox with a second mailbox at a second site by providing said first token to said second mailbox; and playing said first message at said second site responsive to said second mailbox receiving said first token.

13. The method of claim 12, further comprising:

receiving a third message at a third mailbox at a third site;

generating a second token corresponding to said third message;

linking said third mailbox with said second mailbox by providing said second token to said second mailbox; and playing said third message at said second site responsive to said second mailbox receiving said third token.

14. The method of claim 12, wherein said playing said first message comprises downloading said first message from said first site to said second site when said second mailbox is accessed.

15. The method of claim 12, wherein said linking comprises identifying a particular mailbox of a plurality of mailboxes as said second mailbox.

16. The method of claim 15, wherein said identifying comprises identifying said particular mailbox as said second mailbox according to a predetermined schedule.

17. The method of claim 12, further comprising providing an option of whether to play said message at said second site responsive to reception of said first token prior to playing said first message.

18. A method for coordinating delivery of messages across a plurality of messaging systems at remote sites, each of said plurality of messaging systems having a mailbox assigned to a common user, the method comprising:

storing a list of said mailboxes at other systems at each mailbox assigned to said common user;

receiving one or more messages at one or more of said mailboxes;

accessing one of said mailboxes for messages; and using said list for automatically serially logging into a predetermined number of said other mailboxes in said plurality of messaging systems to check for messages responsive to said one of said mailboxes being accessed.

19. The method of claim 18, wherein said storing said list comprises storing a list of mailboxes which have received a message for said user.

* * * * *